UNITED STATES PATENT OFFICE.

MAURICE NICLOUX, OF PARIS, FRANCE.

METHOD FOR OBTAINING MATERIAL FOR SAPONIFYING FATS AND OILS.

No. 837,710.     Specification of Letters Patent.     Patented Dec. 4, 1906.

Application filed May 23, 1904. Serial No. 209,325.

*To all whom it may concern:*

Be it known that I, MAURICE NICLOUX, a citizen of the Republic of France, residing in Paris, France, have invented certain new and useful Improvements in Material for Saponifying Fats and Oils and a Method for Obtaining It, of which the following is a specification.

It is known that when castor-oil seed or castor-oil cake is triturated with castor-oil or any other oil it gives rise to a saponification, provided there be present a small quantity of mineral or organic acid. This saponifying action has been attributed to the presence of a ferment.

By my invention I separate the active material, which produces the saponification, from the seed or oil-cake, so that these need not be introduced into the substance to be saponified. For this purpose I prefer to use the seed, the oil-cake having already undergone a treatment which is of a nature to diminish the activity. I first crush the castor-oil seed, which may be decorticated or not, and then triturate the mass with castor-oil obtained from a previous operation. I then filter, first through a coarse mesh, afterward through a finer mesh, and thus obtain a turbid oil. The residue may be taken up again by oil, filtered, and the turbid oil thus obtained added to the first portion. Although I prefer to treat the seeds with oil in this way, a like treatment of the oil-cake is also a part of my invention. I now subject the oil to centrifugal action, whereupon all the saponifying activity is found to reside exclusively in the matter at the bottom of the tube in which the centrifugal action has occurred. The supernatent oil when perfectly clear and free from the said matter is deprived of all saponifying action. After the centrifugal treatment the matter at the bottom of the tube is in two layers, the lower one being whitish and consisting of grains of aleurone. The upper one is grayish and constitutes the active matter, being composed mainly of portoplasm. Separation of the aleurone grains from the protoplasm has not hitherto been accomplished. Aleurone grains when pure have not in themselves any saponifying action. The active matter thus obtained contains about eighty per cent. of oil and is endowed with considerable activity, as will be shown below. The yield of active matter still containing oil as it is obtained in the tube of the centrifugal machine is about 7.5 per cent. of the not decorticated seed. This active material must be allowed to act in an acid medium. Ten kilos of it still containing oil will saponify practically completely one thousand kilos of oil or fat in twenty-four hours at the ordinary temperature. This result requires the use of one hundred and thirty kilos of castor-oil seed, which yield also eighty kilos of castor-oil fit for ordinary commercial use. Thus the cost of saponifying in this manner is inconsiderable. Supposing that the active substance were extracted from the oil which accompanies it, two kilos would suffice, according to calculation, to saponify one thousand kilos of oil.

The method I have described for extracting the active material from castor-oil seeds is applicable to other seeds containing the material.

I will now describe certain modifications of my improved method.

*a.* The castor-oil seeds are crushed and mixed with a suitable oil, such as cotton-seed oil. The mass is strained or filtered on silk fabric or some other suitable filter. The oil which runs through contains almost exclusively the active material.

*b.* Castor-oil cake is treated as in *a*. The chief part of the oil containing the active material is in this case cotton-seed oil or any other oil which may have been used.

*c.* The crushed castor-oil seeds are mixed with a suitable oil, such as cotton-seed oil. The mixture is subjected to centrifugal action, whereby the aleurone grains are collected together. The supernatant oil contains the active material and by adding acidified water may be saponified directly.

*d.* The castor-oil seeds are crushed and mixed with a suitable oil, such as cotton-seed oil. The mass is filtered through ordinary fabric and the oil is mixed with a solvent, such as light petroleum (benzin) and subjected to centrifugal action. Two layers, aleurone grains and the active material, are obtained and separated. The centrifugal treatment may also be arrested at the precise moment when the aleurone grains have segregated. The liquid may then be decanted and again subjected to centrifugal action to obtain the active material.

*e.* The oil-cake from decorticated castor oil seeds is crushed, treated with light petroleum, and allowed to settle. Two layers are formed, the lower consisting of aleurone grains almost destitute of active material, the upper consisting of the active material with some cellular debris. The active material may be obtained by separating the upper layer and evaporating the petroleum.

f. The crushed seeds are treated with hot castor-oil. The mass is filtered through ordinary fabric, and the filtrate allowed to rest at 80° to 90° centigrade, whereupon the aleurone grains settle rapidly. The supernatant turbid oil is mixed with a solvent, such as light petroleum, and subjected to centrifugal action. The active material is thus separated.

g. The crushed seeds are treated with light petroleum and the mass filtered through extremely fine fabric. The solution of oil which runs through contains the active material almost exclusively. The petroleum is evaporated to obtain castor-oil containing the active material.

h. Same treatment as in g, with substitution of centrifugal treatment for filtration. The centrifugal treatment is stopped at the precise moment when the aleurone grains are completely segregated. On decantation and evaporation of the petroleum there is obtained the active material in castor-oil.

i. The oil-cake is treated with about a quarter of its weight of a suitable oil, such as cotton-seed oil. It is crushed, mixed with light petroleum, and otherwise treated as in g. The active material is thus obtained in the cotton-seed or other oil.

j. Same treatment as in i, except that instead of filtration centrifugal treatment is used. The finish is as in h. The active material is thus obtained in the cotton-seed or other oil.

k. The castor-oil seeds are crushed with castor-oil or some other oil. The mass is filtered through extremely-fine fabric or subjected to centrifugal action to remove the aleurone grains and then filtered through fullers' earth, which retains the active material.

l. The described method and the modifications described under a, b, d, f, k may be effected from the beginning of the treatment, so that the oil will contain more and more active material. This methodical enrichment is obtained by the passage of the oil over seeds which are more and more rich, and, vice versa, the treated oil extracts from the beginning the substance contained in the seeds which have already been extracted and which lose by degrees the active material which they contain.

m. To prepare the dry active material, the proportion of solvent, light petroleum, or another is increased, the mass subjected to centrifugal action, the deposit again mixed with solvent, and again subjected to centrifugal action. The active material is thus freed from the oil which was its vehicle. This dry preparation of the active material has only a secondary interest, for in order to make it act subsequently on oil it is necessary to first suspend it again in oil.

Having now particularly described and ascertained the nature of my said invention and in what manner the same is to be performed, I declare that what I claim is—

The process of extracting from castor-oil seeds a material for saponifying fats and oils, which consists in triturating crushed seeds with additional castor-oil, filtering, and subjecting the filtered oil to centrifugal action.

In witness whereof I have hereunto signed my name in the presence of two subscribing witnesses.

MAURICE NICLOUX.

Witnesses:
 JULES ARMENGAUD, Jeune,
 HANSON C. COXE.